2,959,362
PROCESS OF MAKING RESINOUS GRANULES

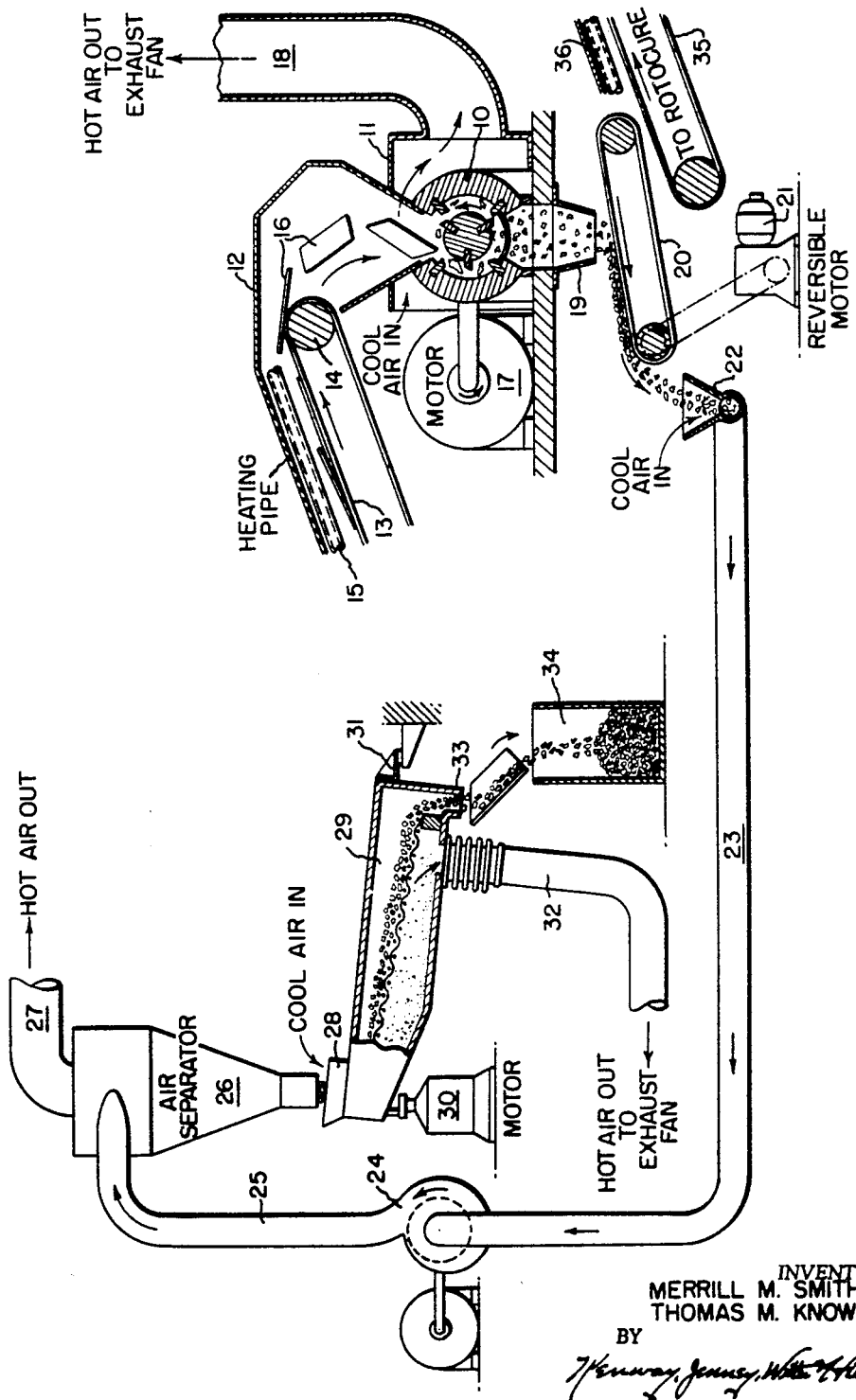
Nov. 8, 1960   M. M. SMITH ET AL   2,959,362
PROCESS OF MAKING RESINOUS GRANULES
Filed Feb. 12, 1957
INVENTORS
MERRILL M. SMITH
THOMAS M. KNOWLAND
BY
ATTORNEYS

United States Patent Office 2,959,362
Patented Nov. 8, 1960

Merrill M. Smith, Yardley, Pa., and Thomas M. Knowland, Belmont, Mass., assignors, by mesne assignments, to American Biltrite Rubber Company, Inc., a corporation of Delaware Filed Feb. 12, 1957, Ser. No. 639,760

1 Claim. (Cl. 241—3)

This invention comprises a new and improved process of making discrete color granules of resinous plastic compound for use in the manufacture of flooring of the terrazzo tiling type.

Terrazzo tiling consists of a base or matrix material that supplies the background color in which are dispersed granules of contrasting color so that the effect of these granules in the matrix of the base material is to produce the characteristic terrazzo effect. Since many of the plastic compounds employed are thermoplastic, it is extremely difficult to incorporate the colored granules in the matrix without softening, deforming and smearing them to such an extent that the desired effect is destroyed. This difficulty is caused by the mixing procedures which must be followed in order to produce the tilting in sheet form.

The matrix is prepared in the usual manner from a composition of plastic resin, plasticizer and other modifying ingredients with the assistance of a preblender and Banbury mixer. During the Banbury mixing operation the colored granules must be introduced into the mix in such a way that they are surrounded by and adhered to the matrix without losing their form as discrete unsmeared granules. To accomplish this purpose we therefore introduce the granules which have been ground or chopped into discrete particles having a specified screen analysis and which have been held at a temperature sufficiently low to avoid undue softening and resultant smearing when mixed and milled into the plastic matrix.

In accordance with the present invention the colored granules are prepared by preblending and mixing a plastic compound of the desired color similar to the procedure used in making the matrix. The composition of plastic resin, plasticizer, coloring ingredients etc. are mixed in a Banbury and advanced to sheeter mills which turn the mass into a rough plastic sheet. The sheet may be reduced to slabs of convenient size for feeding into a granulator or a coarse grinder.

Considerable difficulty has been encountered heretofore on account of the fact that the prepared plastic compound hardens when cool to such an extent that it is difficult to reduce it in cold condition to satisfactory granules. We have discovered, however, that the compound when converted to slab formation may be successfully granulated if maintained at a temperature of 200° to 250° F. The action of the granulator in reducing the strips to granules generates heat frequently causing a rise in temperature of the granules above 300° F. and at or near this temperature they can not be stored or packed since they tend to fuse together. Our novel process is therefore characterized by maintaining the plastic compound at a relatively high temperature during the granulating or grinding step and then promptly cooling the granules for further handling and storage, or for transferring the granules at the most advantageous temperature to a "Rotocure" machine for incorporation in the matrix compound. Our process provides the requisite temperature control of the composition prior to, during and subsequent to the granule-forming step, or from start to finish of the entire operation.

These and other characteristics and advantages of our invention will be best understood and appreciated from the following description of a preferred manner of carrying it into effect, employing mechanism selected for purposes of illustration and shown diagrammatically in the accompanying drawing.

The actual coarse grinding or chopping of the sheeted composition into discrete granules is herein shown as done in a grinder 10 having a cylindrical outer frame carrying stationary blades and an inner rotor carrying a series of cooperating radial blades and driven by means, not shown. The type of grinder is of secondary importance and any suitable unit may be employed for this step of our process.

The grinder 10 is partially enclosed within a casing 11 apertured to receive an overhead input hopper 12 formed as part of a duct containing a conveyor 13 running over a pulley 14. The duct also contains a heating unit in the form of a steam pipe 15 which serves to maintain slabs 16 of plastic composition at the desired temperature as they are carried inwardly and upwardly by the conveyor 13 and delivered to the grinder. The slabs 16 may be cut to any convenient size from the plastic compound as sheeted after it leaves the Banbury and preferably before it is allowed to cool. In practice these slabs are approximately 25" x 5" x 0.3" in dimensions and are delivered to the grinder at a temperature of 200° to 250° F.

The grinding operation tends substantially to increase the temperature of the compound and in order to offset that tendency a motor-driven blower 17 is arranged to force a copious amount of cool air through the casing 11 and about the grinder 10. The air is discharged from the casing and exhausted through an outlet as. shown.

The hot discrete granules formed in the grinder 10 are delivered downwardly through the exit chute 19 to an underlying conveyor 20 driven by a reversible motor 21 with which it has belt-driving connections. The conveyor 20 is herein shown as running toward the left and as transferring the still hot granules to a hopper 22 leading to a long duct 23. The granules are conveyed while suspended by air flowing along this duct to and through a motor-driven blower 24, and then through a vertical duct 25 to a cyclone separator 26. Cool air is sucked into the system through the hopper 22 and, after flowing through the duct 23, is discharged from the separator through its outlet duct 27, the granules being cooled in transit.

In the separator 26 the partially cooled granules from the grinder are separated from their entraining air and delivered downwardly to the hopper 28 of a classifier 29 containing a downwardly sloping screen. The classifier may be of any commercially available construction and is herein shown as vibrated by connections at one end with a motor 30 and supported at its other end by a bracket 31. The fines passing through the screen of the classifier are withdrawn at an outlet duct 32 by the action of an exhaust fan (not shown) and may be returned to the Banbury for reincorporation in the plastic compound. The coarser granules which do not pass through the screen flow downwardly through an outlet chute 33 in the bottom of the classifier and are now cool enough for collection in a barrel 34 for storage in bulk or for immediate incorporation in the compound of the base or matrix.

The granules may be subjected to further cooling in the classifier by connecting the outlet duct 32 to an exhaust fan which operates to draw cool air through the granules as distributed on the screen of the classifier.

That phase of the invention above described deals with the production of colored granules for storage where they may be maintained in reserve for use as desired. However, the granules as delivered to the conveyor 20 may be transferred immediately and directly to a "Rotocure" machine by reversing the direction of the conveyor 20 and, instead of delivering to the hopper 22, delivering to an underlying conveyor 35 shown as running upwardly and toward the right to the "Rotocure" machine, not shown. For such a destination it is desired to hold the granules at a temperature of 200° to 250° F. for introduction into the matrix compound which may be itself at 300° to 350° F. The conveyor 35 is therefore equipped with a heating unit in the form of a steam pipe 36 and the granules thus maintained at the desired elevated temperature.

A usual procedure in making the finished terrazzo sheet is to mix the cooled discrete color granules into the hot matrix at the Banbury, the mixture being then sheeted, cut in slabs, and fed to the granulator which produces a stream of composite granules having the original color granules imbedded as discrete particles, the matrix color granules being then fed by conveyor 20 to conveyor 35 and thence to the "Rotocure" for molding into a terrazzo plastic sheet.

In practice granules from the conveyor 20 may be passed direct in warm condition to the production system of the plant for five or six hours and then directed to storage in bulk in cool condition for the remaining portion of the day to accumulate a reserve supply to use in starting the production system or for assorted mixing with granules of other colors.

Having thus disclosed our invention and described an illustrative manner of carrying it out, we claim as new and desire to secure by Letters Patent:

The improved continuous process of making discrete color granules of resinous plastic compound, comprising the steps of first heating slabs of the colored compound at a temperature of 200° to 250° F., grinding the heated slabs into granules while subjected to a cooling air stream, further cooling the granules by conveying them by air in an extended path, separating the granules from the conveying air, classifying the separated granules and collecting the now-cooled granules selected for storage according to their size.

References Cited in the file of this patent

UNITED STATES PATENTS

| | | |
|---|---|---|
| 1,706,643 | Wiley | Mar. 26, 1929 |
| 1,728,496 | Lindhard | Sept. 17, 1929 |
| 2,032,624 | Lyons | Mar. 3, 1936 |
| 2,149,289 | Hall | Mar. 7, 1939 |
| 2,297,505 | Schmidberger | Sept. 29, 1942 |
| 2,367,179 | Arnold | Jan. 16, 1945 |
| 2,461,089 | Smidth | Feb. 8, 1949 |
| 2,516,295 | Borton et al. | July 25, 1950 |
| 2,548,900 | Ryden | Apr. 17, 1951 |
| 2,624,514 | Wilhousky | Jan. 6, 1953 |
| 2,657,797 | Ledgett | Nov. 3, 1953 |
| 2,697,249 | Bettes | Dec. 21, 1954 |
| 2,755,509 | Smidth | Jnly 24, 1956 |
| 2,844,327 | Bateman | July 22, 1958 |

FOREIGN PATENTS

| | | |
|---|---|---|
| 649,249 | Great Britain | Jan. 24, 1951 |